L. FERRARI.
EDUCATIONAL APPARATUS.
APPLICATION FILED JUNE 9, 1919.
1,384,801. Patented July 19, 1921.
3 SHEETS—SHEET 1.
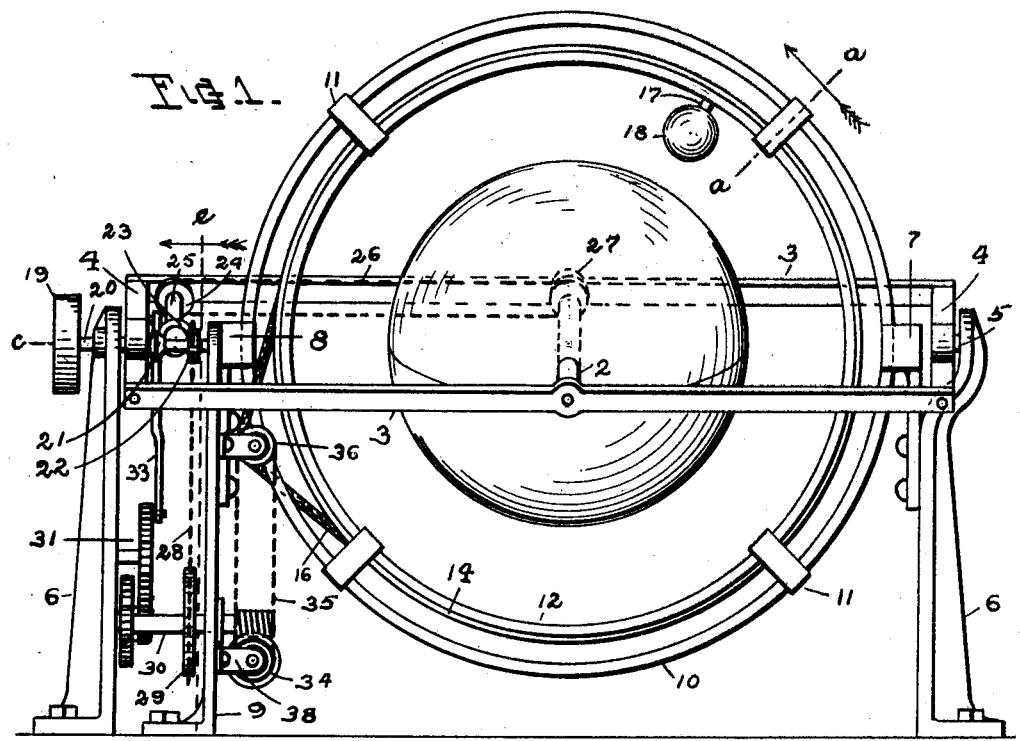
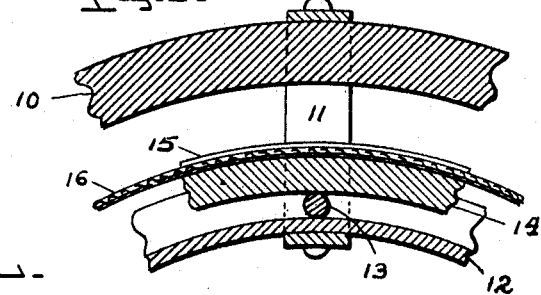
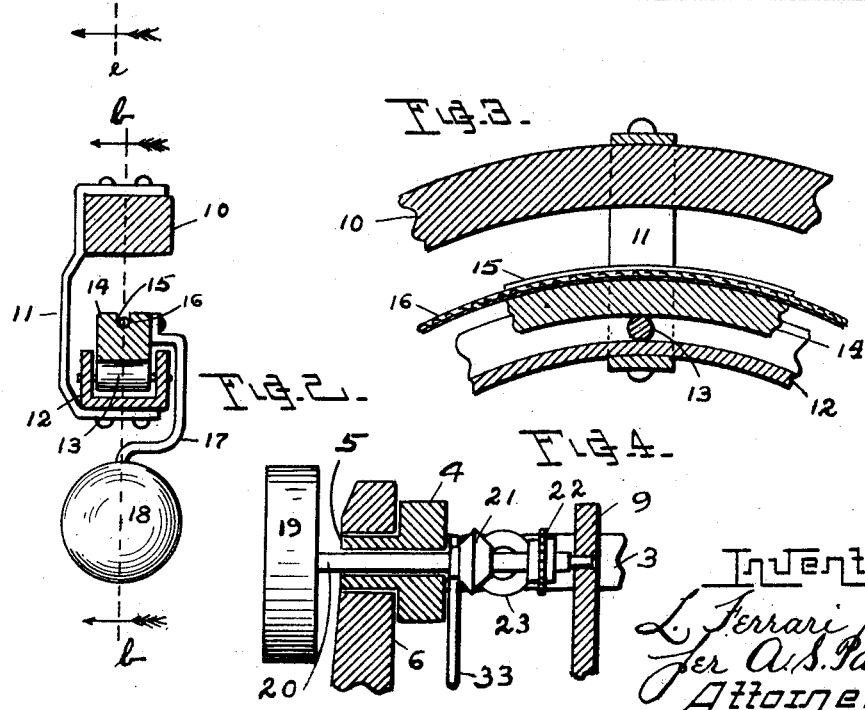
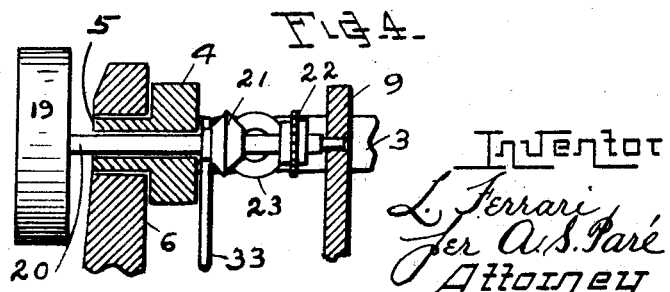
Inventor
L. Ferrari
Per A. S. Paré
Attorney L. FERRARI.
EDUCATIONAL APPARATUS.
APPLICATION FILED JUNE 9, 1919.
1,384,801.
Patented July 19, 1921.
3 SHEETS—SHEET 2.
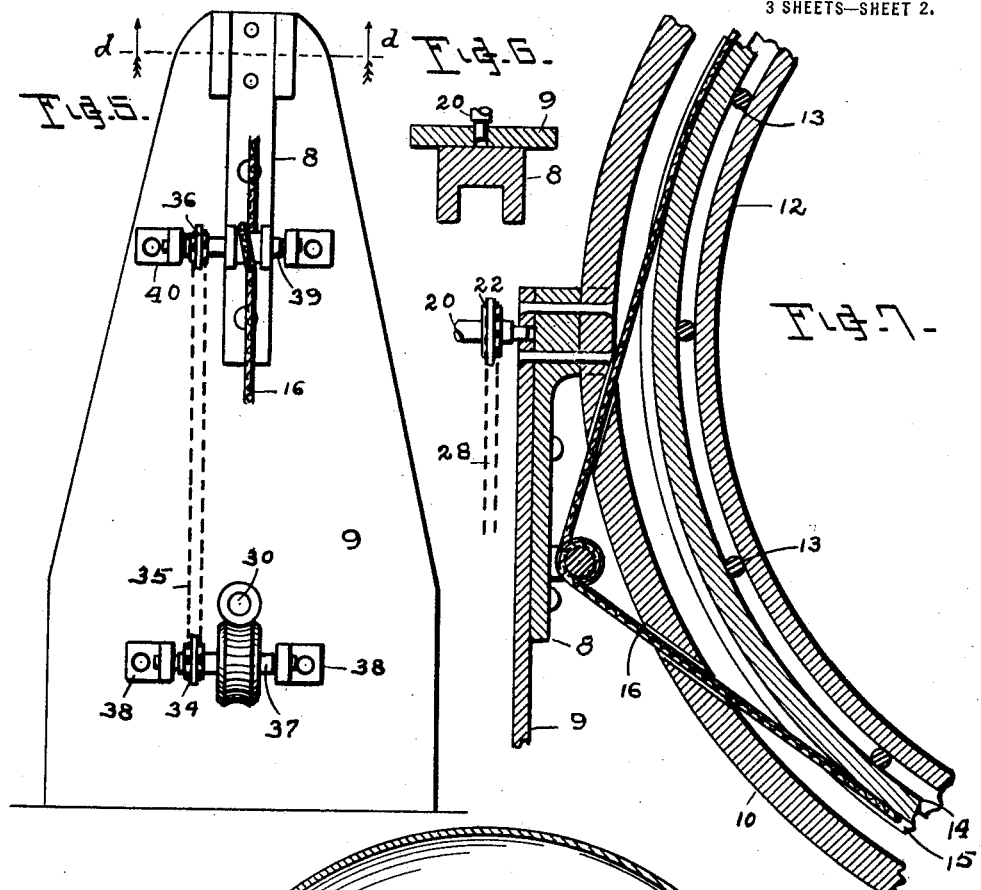
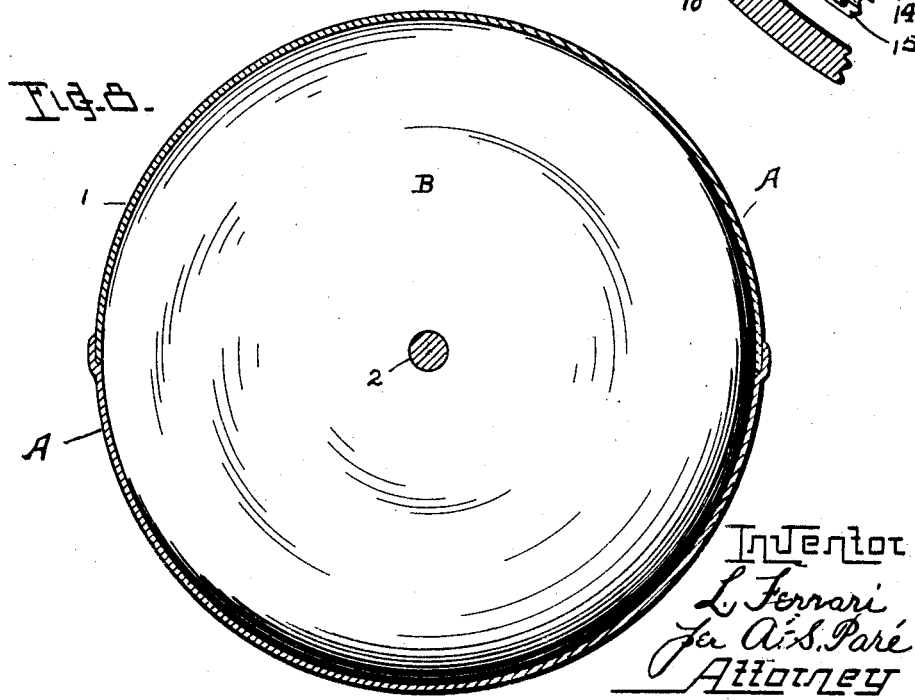

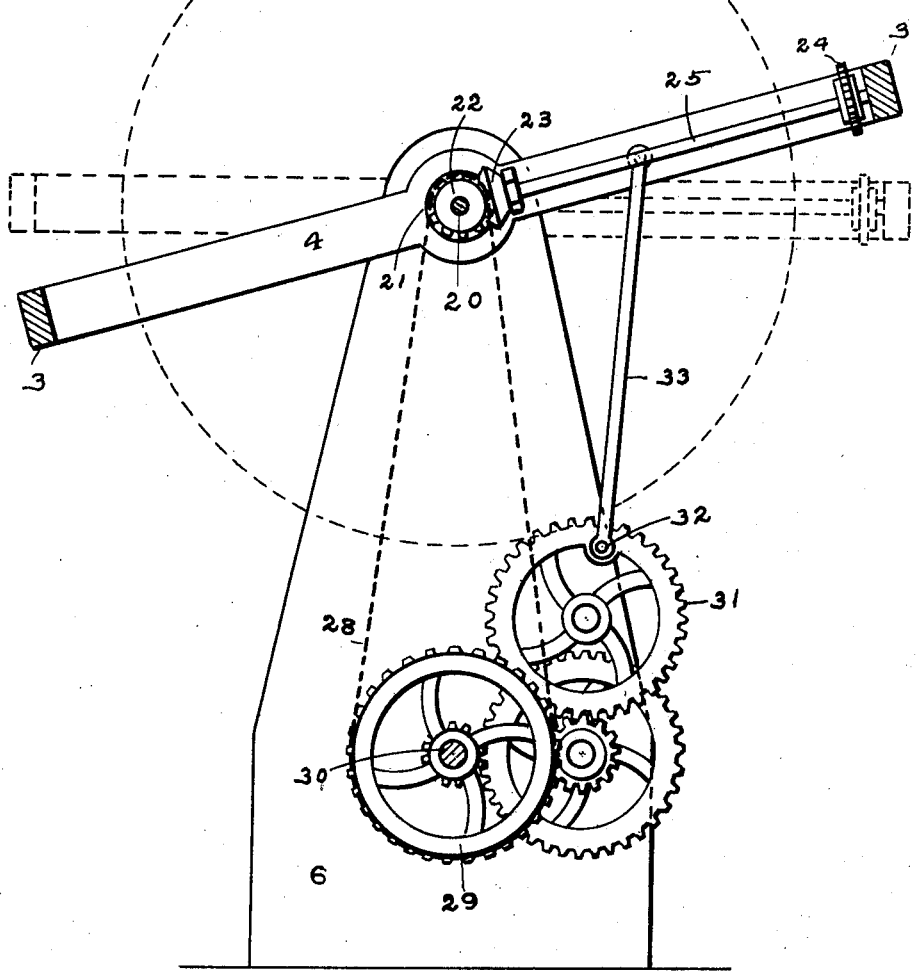

UNITED STATES PATENT OFFICE.

LORENZO FERRARI, OF OAKLAND, CALIFORNIA.

EDUCATIONAL APPARATUS.

1,384,801.     Specification of Letters Patent.     Patented July 19, 1921.

Application filed June 9, 1919. Serial No. 302,715.

*To all whom it may concern:*

Be it known that I, LORENZO FERRARI, of Oakland, California, have invented certain new and useful Improvements in Educational Apparatus, whereof the following is a specification.

This invention relates to educational apparatus, and is in the nature of an orrery, and designed to explain the motions of the earth and moon in space.

In carrying out the invention I make use of the following mechanism. I construct a globe to illustrate the earth, which may have maps marked thereon to exhibit the land and water systems of the same. This globe is mounted to rotate about its axis, and is provided with a second, smaller, sphere, to represent the moon, and arranged to revolve about the earth-globe. The system thus arranged, is mounted to be given successive various inclinations to represent the various inclinations of the earth's axis to the radius vector, or line connecting it with the sun, to illustrate how the sun's light strikes the earth and moon in their different phases. The motions above mentioned are given by means of mechanism which will be fully described hereinafter, in connection with the drawings hereto attached in which, in three sheets I have illustrated my invention and in which;

Figure 1 is an elevation of the apparatus, showing the earth and its supports and the mechanism for operating it, and the moon and mechanism for supporting it and rotating it about the earth.

Fig. 2 is a detail view, a section taken on the line *a, a,* of Fig. 1.

Fig. 3 is a detail, a partial section taken on the line *b, b,* of Fig. 2.

Fig. 4 is a sectional elevation taken on line *c* of Fig. 1 showing the hollow trunnion and the arbor extending therethrough.

Fig. 5 is a view of the mechanism for rotating the moon about the earth.

Fig. 6 is a section taken at the line *d, d,* of Fig. 5.

Fig. 7 is a partial section of the moon rotating devices.

Fig. 8 is a view of the globe which represents the earth, showing a transparent shell in section and a ball in elevation therein.

Fig. 9 is a sectional elevation taken on the line *e, e,* of Fig. 1.

In these figures;—

The globe 1, which represents the earth, may be made in two or more parts, as shown more particularly in Fig. 8, and may be made of glass or other transparent material A, having within it a ball B with maps or other markings thereon. This globe is mounted on the axis 2, which represents the axis of the earth. The axis 2 is supported in a frame composed of side pieces 3 and end pieces 4, which frame is adapted to rock or oscillate on trunnions 5 mounted in standards 6.

A bracket 7, attached to one of the standards 6, and a bracket 8 attached to a subsidiary standard 9, near the opposite end of the frame, support a ring 10, which is concentric with the earth-globe 1, and between the side pieces 3 of the frame. This ring 10, by means of bracket pieces 11, supports an inner concentric ring 12 of channel cross-section. Within the channel of ring 12 are a series of antifriction rollers 13, upon which rides a ring 14, which has a groove 15 in its outer periphery, said groove being for the purpose of receiving a belt 16, to give motion to the said ring. A bracket 17 attached to ring 14 and extending inward, carries at its inner end a sphere 18, which represents the moon, and which is revolved about the earth 1 by the movement of the ring 14.

A driving pulley 19, is mounted on an arbor 20 which extends through one of the standards 6 and through one of the end pieces 4, through the hollow trunnion thereof and is journaled at its end in the standard 9 as shown particularly in Fig. 4. Upon this arbor is mounted a bevel pinion 21 and a sprocket pinion 22. The bevel pinion 21 enmeshes a similar pinion 23, connected to a sprocket pinion 24 by a shaft 25, which may be journaled in the adjacent side piece 3. The sprocket 24, by means of a chain 26, drives a sprocket wheel 27 upon the earth-axis 2 as shown in Fig. 1, and thus rotates the earth.

The sprocket wheel 22, by means of a chain 28, drives a sprocket wheel 29, and a shaft 30, to which it is attached. This shaft 30, is journaled in the standards 6 and 9, and drives a system of gearing, shown more particularly in Fig. 9, which includes a crank wheel 31. The wrist pin 32, of the crank wheel 31, is connected by a pitman 33 to the contiguous end piece 4 of the earth supporting frame, so as to oscillate the latter. Upon its free end the shaft 30 carries one member of a gear system which gives rotation to a chain wheel 34, which, by means of a chain or belt 35 gives motion to belt pulley 36, and in turn to the belt 16, by which the moon is revolved. For this purpose the wheel 34 may be mounted on a short shaft 37 supported by brackets 38, and the belt pulley 36 similarly mounted on a shaft 39 in a pair of brackets 40. Both said pairs of brackets are attached to standard 9.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to wit:

1. An orrery comprising a globe mounted in a frame and adapted to rotate therein, a ring rotatably mounted around said globe, a sphere mounted on said ring and adapted to be revolved thereby about said globe, and means for giving said motions to said members.

2. An orrery comprising a frame supported by standards and adapted to oscillate, means for oscillating said frame, a globe rotatably mounted in said frame, means for rotating said globe, a stationary ring concentric with said globe, a rotatable ring mounted on said stationary ring, means for rotating said rotatable ring, and a sphere supported by said rotatable ring contiguous to said globe.

3. An orrery comprising a globe mounted in an oblong frame and adapted to rotate therein, said frame having trunnions on its ends journaled in standards, one of said trunnions being hollow, an arbor extending through said hollow trunnion and having driving means at its outer end, and gearing at its inner end adapted to rotate said globe, and means operated by said arbor for oscillating said frame.

4. An orrery comprising a globe mounted in a frame and adapted to rotate therein, inner and outer stationary rings concentric with said globe, a rotatable ring mounted upon said inner ring, a sphere carried by said rotatable ring and means for rotating said rotatable ring.

5. An orrery comprising an oscillating frame, a globe mounted in said frame and adapted to rotate therein, inner and outer stationary rings concentric with said globe, a rotatable ring mounted upon said inner ring, a sphere carried by said rotatable ring, means for rotating said rotatable ring and means for oscillating said frame.

6. An orrery comprising an oscillating frame mounted upon standards, a globe mounted upon said frame and adapted to rotate therein, inner and outer stationary rings concentric with said globe, secured to said standards, a rotatable ring mounted upon said inner ring, a sphere carried by said rotatable ring, combined means for revolving said rotatable ring and oscillating said frame.

7. An orrery comprising a frame supported by standards, a globe rotatably mounted in said frame, means for rotating said globe, inner and outer stationary rings mounted upon said standards, a rotatable ring mounted between said stationary rings carrying a sphere and means mounted upon said standards adapted to rotate said rotatable ring.

8. An orrery comprising a movable frame supported by standards, a globe rotatably mounted in said frame, a stationary ring secured to said standards, a rotatable ring mounted on said stationary ring, antifrictional rollers between said rings, a sphere supported by said rotatable ring, means for moving said frame, means for rotating said globe and means for rotating said rotatable ring.

In testimony that I claim the foregoing I have hereto set my hand in the presence of two witnesses this 2nd day of June, 1919.

LORENZO FERRARI.

Witnesses:
W. S. BATES,
F. L. WOLFE.